(12) United States Patent
Canadas

(10) Patent No.: US 6,179,249 B1
(45) Date of Patent: Jan. 30, 2001

(54) TURBOJET POD WITH LAMINAR FLOW

(75) Inventor: Marc Canadas, Toulouse (FR)

(73) Assignee: Aerospatiale Societe Nationale Industrielle, Paris (FR)

(*) Notice: Under 35 U.S.C. 154(b), the term of this patent shall be extended for 0 days.

(21) Appl. No.: 09/125,204

(22) PCT Filed: Dec. 24, 1997

(86) PCT No.: PCT/FR97/02429

§ 371 Date: Aug. 13, 1998

§ 102(e) Date: Aug. 13, 1998

(87) PCT Pub. No.: WO98/29306

PCT Pub. Date: Jul. 9, 1998

(30) Foreign Application Priority Data

Dec. 26, 1996 (FR) .................................................. 96 16038

(51) Int. Cl.[7] .................................................. B64D 29/06

(52) U.S. Cl. .................................. 244/53 R; 244/134 B; 244/129.4

(58) Field of Search .............................. 244/53 R, 129.4, 244/110 B, 134 R, 134 B; 403/337, 335; 60/226.2; 239/265.31

(56) References Cited

U.S. PATENT DOCUMENTS

| | | | |
|---|---|---|---|
| H648 | * | 7/1989 | Tran . |
| 3,067,968 | * | 12/1962 | Heppenstall . |
| 3,981,466 | * | 9/1976 | Shah . |
| 4,206,893 | * | 6/1980 | Howard . |
| 4,738,416 | * | 4/1988 | Birbragher . |
| 5,035,379 | * | 7/1991 | Hersen et al. . |
| 5,052,891 | * | 10/1991 | Burkholder . |

FOREIGN PATENT DOCUMENTS

| | | | |
|---|---|---|---|
| 1375868 | * | 11/1974 | (GB) . |
| 1520759 | * | 8/1978 | (GB) . |

* cited by examiner

Primary Examiner—Peter M. Poon
Assistant Examiner—Tien Dinh
(74) Attorney, Agent, or Firm—Burns, Doane, Swecker & Mathis, LLP

(57) ABSTRACT

The bay (12) of a turbofan engine (10) comprises a front structural element (30), whose external surface is continuous and extends over at least 50% of the geometrical chord of the bay. Said element (30) is installed on maintaining and guiding members (44), such as slides, which prevent a significant deformation in flight and allow a sliding to the front of the element (30) for maintenance purposes. A laminar air flow around the front half of the bay (12) is consequently ensured.

15 Claims, 6 Drawing Sheets

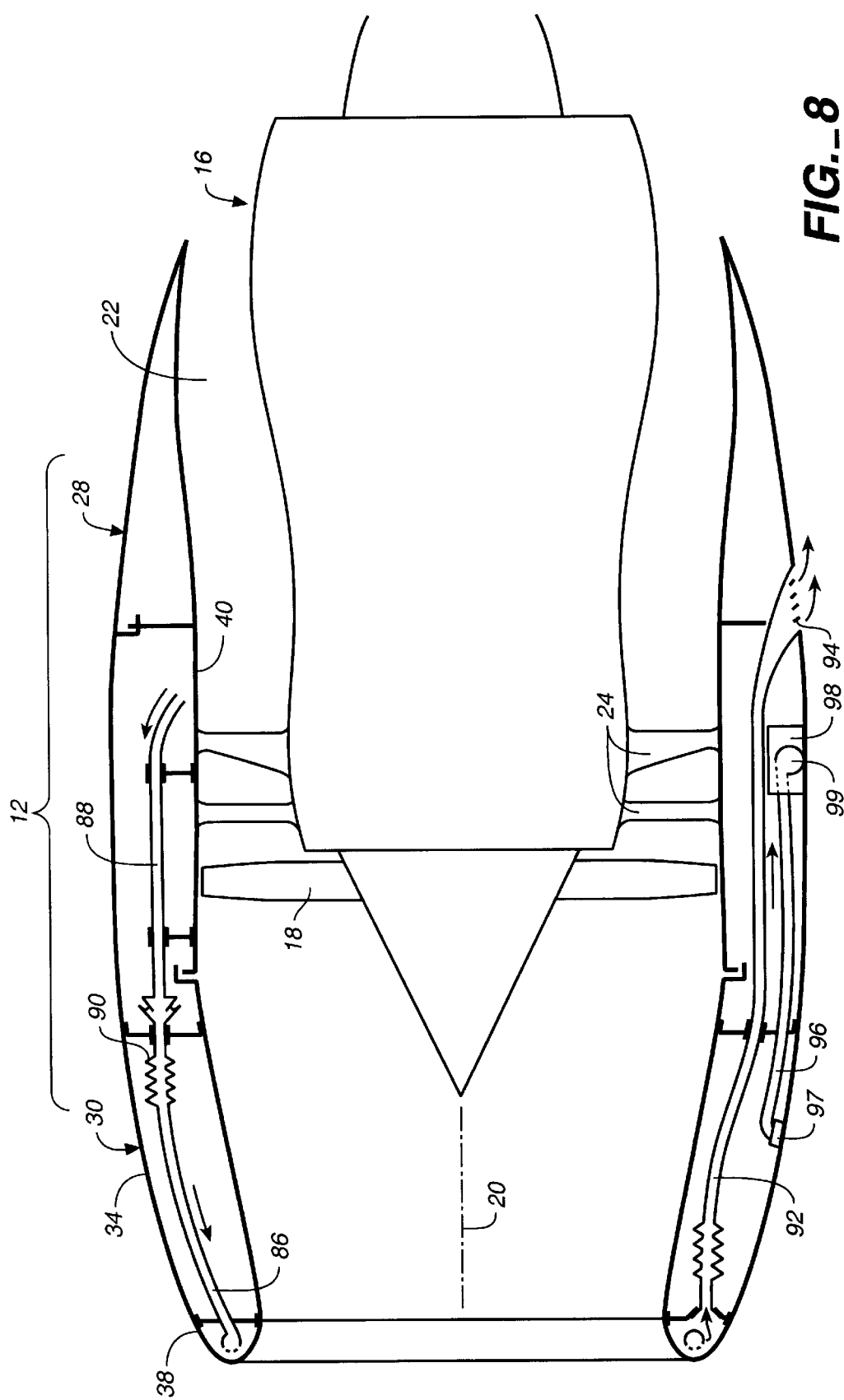
FIG._8

TURBOJET POD WITH LAMINAR FLOW

DESCRIPTION

1. Technical Field

The invention relates to a jet engine bay, whose architecture is optimized, so as to ensure a laminar air flow around the bay up to the vicinity of the thrust reversers. The invention more particularly applies to turbofan engine bay equipping aircraft.

2. Prior Art

In a turbofan engine, the bay channels around a core engine the secondary air flow produced by a fan, which is driven by a low pressure turbine forming part of the core engine.

The mechanical connection between the jet engine and the aircraft wings is ensured by a structure known as a pylon. This complex structure ensures the transmission of forces and permits the passages of various circuits, particularly hydraulic circuits, linking the jet engine with the aircraft.

Starting from the front of the engine in the air flow direction, the bay generally incorporates an air intake box, pivoting cowls giving access to an accessory box housed in the bay, thrust reversers and articulated cowls for the maintenance of the core engine.

In this conventional architecture, the mobile elements constituted more particularly by the pivoting cowls positioned immediately behind the air intake box create significant discontinuities, which greatly disturb the aerodynamic air flow along the outer surface of the bay. Thus, although this shape is optimized so that the theoretical air flow is laminar, at least around the front half of the bay, it is impossible to obtain such a flow in practice. This leads to an undesired increase in drag compared with the theoretical value thereof.

Moreover, articulated cowls are thin and not very stiff structures. Thus, in flight, they are subject to significant deformations, which does not permit the maintenance of their aerodynamic shape. When the aircraft is flying, these deformations increase the distortion between the theoretical, laminar air flow around the front half of the bay and the true value of said flow. This further prejudices the drag.

With reference to FIGS. 8 and 9, FR-A-2 732 074 envisages the replacement of the pivoting cowls normally positioned behind the air intake box of the bay by an external envelope fixed to the pylon and rearwardly extending said box.

Compared with a conventional bay architecture, this arrangement makes it possible to eliminate the surface discontinuities around all the front part of the bay, with the exception of the area where it is connected to the pylon.

However, the fixed, external envelope extending the air intake box in FIGS. 8 and 9 of FR-A-2 732 074 remains a thin metal sheet having no maintaining means over most of its length and circumference. Thus, in flight, said envelope is inevitably subject to sensitive deformations, which do not make it possible to maintain an optimum aerodynamic shape adapted to obtaining a laminar air flow around the bay.

Moreover, the fixing of the front part of the bay to the pylon constitutes a supplementary, external envelope deformation source, which contributes to the illusion of obtaining a laminar flow in flight.

The architecture described in the above document also makes it virtually impossible to install an accessory gearbox in the region of the bay positioned around the fan. Thus, the non-dismantlable character of the external envelope fixed to the pylon prevents any intervention in this region.

DESCRIPTION OF THE INVENTION

The invention relates to a jet engine bay, whose original architecture makes it possible to eliminate any discontinuity, at least over the front half of the external surface thereof, thus controlling both on the ground and in flight, the aerodynamic shape of said surface, so as to ensure there a laminar air flow, whilst rendering possible access to the region of the bay located around the jet engine fan.

According to the invention, this result is obtained by means of a jet engine bay, characterized in that it comprises:

a rear structural element, a front structural element, integrating an air intake box and an external shell extending rearwards and without any discontinuity, an external surface of the air intake box, so that the front structural element has a continuous, external surface extending over at least 50% of the geometrical chord of the bay, maintenance and guidance means, interposed between the front structural element and a jet engine fan case, so as to allow a limited sliding forwards of the front structural element parallel to a longitudinal axis of the bay and locking means normally opposing said sliding.

The expression "geometrical chord" here designates the right-hand segment linking the leading edge of the bay to its trailing edge, when the bay is observed in longitudinal section.

In the bay architecture according to the invention, the continuous, external surface of the front structural element is given an optimum aerodynamic shape, so as to obtain a laminar air flow around the front part of the bay. The presence of maintenance and guidance means between said front structural element and the fan case ensures both the maintenance of the aerodynamic shape of the continuous, external surface, when the aircraft is flying, whilst giving access to the bay region surrounding the fan, when the aircraft is on the ground. The locking means prevent any sliding of the front structural element when the aircraft is flying.

In a preferred embodiment of the invention, the air flow is also improved in the region of the pylon, by implementing the front structural element in such a way that it surrounds and shrouds the front part of the suspended pylon of the jet engine.

In order to take account of certain technical and industrial constraints and to make it possible to replace the front lip of the air intake box when said lip has become damaged, the front structural element incorporates a main structure, made in one piece, as well as an interchangeable, front lip, mounted on the front end of the main structure by dismantlable fixing means. The junction is made in such a way that no discontinuity is created on the external surface of the front structural element.

In the preferred embodiment of the invention, the locking means comprise latches oriented substantially parallel to the longitudinal axis of the bay, so as to ensure under optimum conditions, the transmission of forces between the two structural elements forming the bay. For this purpose, the latches are interposed between the rear end of the front structural element and the front end of the rear structural element.

In order to ensure the transmission of forces between the front structural element and the fan case, the front structural element has a front abutment surface and a rear abutment surface, which normally bear against bearing surfaces formed on the fan case.

The substantially non-deformable character of the continuous, outer surface of the front structural element can be further improved by equipping said element with shear pins, which project rearwards along the longitudinal axis of the bay, from the aforementioned abutment surfaces, so as to penetrate in clearance-free manner into holes formed in the bearing surfaces. This arrangement can be reversed, i.e. the holes can be formed in the abutment surfaces and the shear pins installed on the bearing surfaces.

In the preferred embodiment of the invention, the maintenance and guidance means comprise slides carried by the blower case and on which can slide the front structural element. These slides are spaced from the blower case by a distance exceeding the maximum deformation of the latter, which is liable to be produced by a breaking or fracture of the fan blade.

To take account of the sliding character of the front structural element of the bay, different arrangements can be provided for the lines, which are at least partly placed in said element.

Thus, the bay can have one or more rigid lines, such as the deicing line, formed by a front section installed in the front structural element and a fixed, rear section. These two sections are then aligned parallel to the longitudinal axis of the bay, so as to normally bear by their ends, under the effect of the thermal expansion.

The bay can also have one or more flexible lines, such as a pressure intake line, whereof a first end is connected to the front structural element and whereof a second end is coiled in a fixed receptacle, under the action of tension means.

The bay can also have at least one other line, such as a deicing exit line, located in the front structural element and issuing to the outside of the bay, in the rear structural element.

Due to the architecture according to the invention, the accessory gearbox equipping the jet engine can be located, as desired, either in the rear structural element, or between the fan case and the front structural element.

BRIEF DESCRIPTION OF THE DRAWINGS

A description is given hereinafter of a preferred, but non-limitative embodiment of the invention, with reference to the attached drawings, wherein show:

FIG. 8 A longitudinal sectional view of the bay, which illustrates the installation of two lines within the latter.

DESCRIPTION OF AN EMBODIMENT

Figure 1:
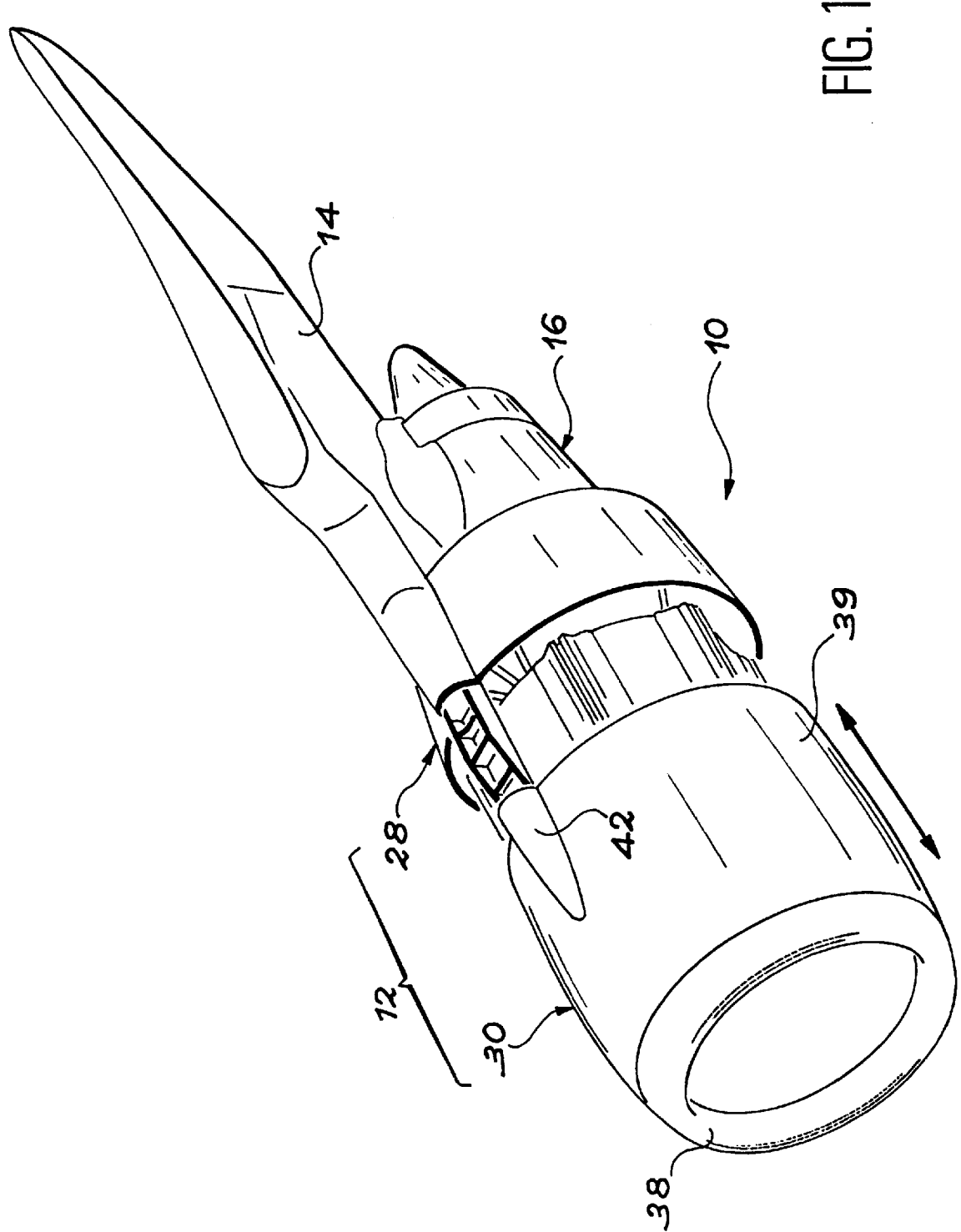
FIG. 1 A perspective view diagrammatically showing a turbofan engine equipped with a bay according to the invention, said bay being illustrated in its maintenance position giving access to the accessory box.

In FIG. 1, the reference 10 designates in general terms a turbofan engine, whose bay 12 is implemented in accordance with the invention. This engine 10 is intended to be attached to a not shown aircraft structure, such as a wing element, by means of a suspension pylon or strut 14.

Figure 2:
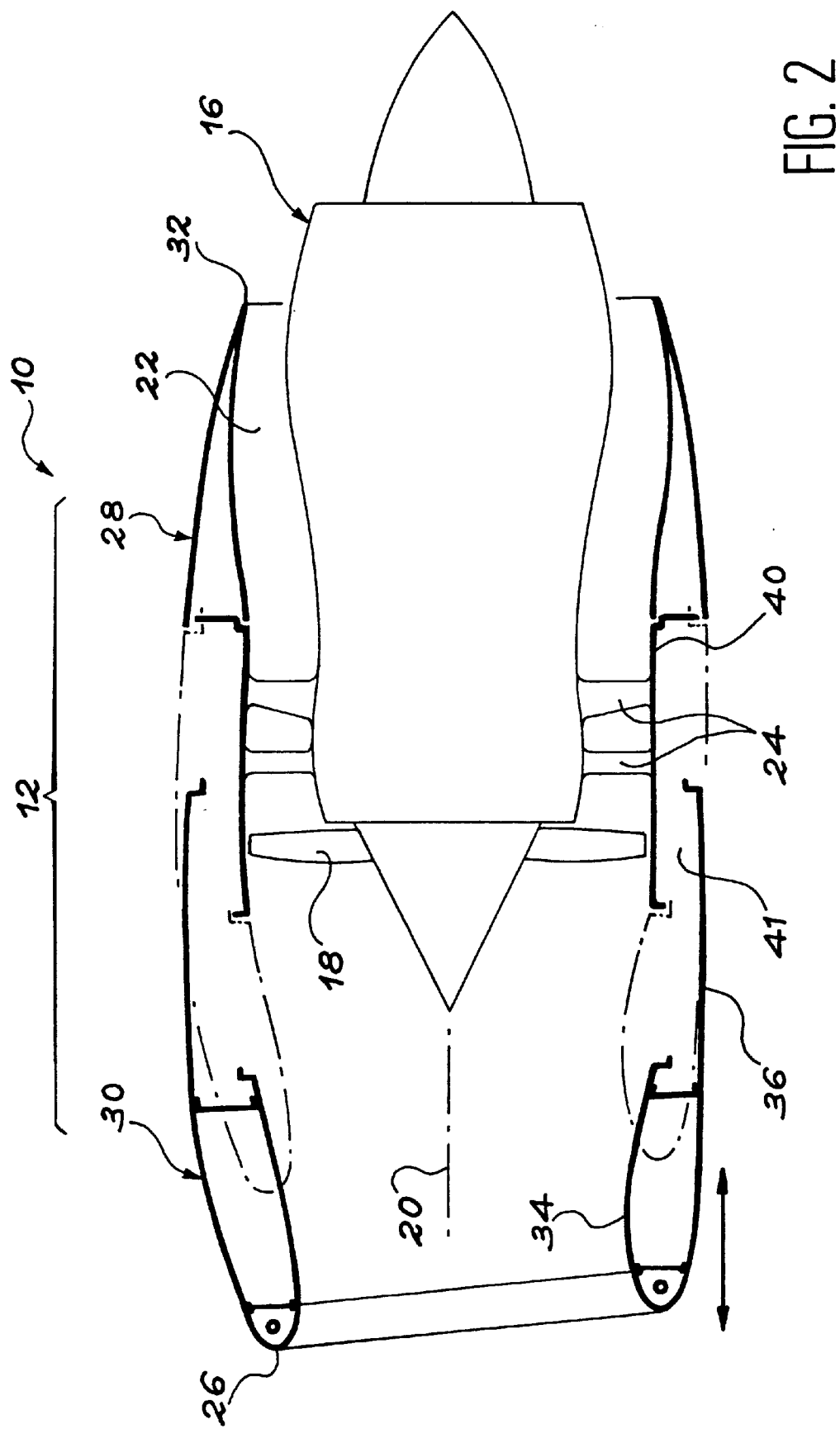
FIG. 2 A longitudinal sectional view diagrammatically representing the jet engine illustrated in FIG. 1, the bay being illustrated in continuous line form in its maintenance position and in mixed line form in its flight position.

As is shown in FIG. 2, the turbofan engine 10 comprises, in conventional manner, a core engine 16, in which the air successively traverses a compressor, a combustion chamber, a high pressure turbine and a low pressure turbine (not shown). The compressor is driven by the high pressure turbine. The low pressure turbine drives a fan 18, installed in front of the core engine 16.

The bay 12 is arranged coaxially around the core engine 16 along a longitudinal axis 20. The annular space 22 between the core engine 16 and the bay 12 channels the secondary air flow created by the fan 18.

The core engine 16 is directly suspended on the pylon 14 in accordance with known procedures, making it possible to take up forces in all directions. The bay 12 is mechanically connected to the core engine 16 by one or more sets of arms 24, oriented substantially radially relative to the longitudinal axis 20.

More specifically, the arms 24 are rigidly connected to a ferrule 40 known as a fan case, which materializes the internal surface of the bay 12, in the region surrounding the fan 18. The fan case 40 is not generally considered to form an integral part of the bay, although it constitutes one of the functional parts thereof.

In a turbofan engine, the bay 12 is internally profiled so as to ensure an effective channelling of the secondary air flow created by the fan 18.

According to the invention, the bay 12 also has a continuous, outer surface, i.e. free from discontinuities, over at least 50% of its geometrical chord, i.e. on at least the front half of its length in the air flow direction, as from the leading edge 26. This feature avoids the creation of turbulence throughout this zone, which makes it possible to ensure a laminar air flow by giving to the outer surface of the bay a profile optimized for this purpose.

The original architecture of the bay 12 according to the invention is designed so as to eliminate or reduce to the minimum the deformations undergone by the outer surface by the considered bay zone when the aircraft is flying. Thus, the laminar character of the air flow around the bay 12 is essentially maintained.

The original architecture according to the invention finally makes it possible to ensure the maintenance of the jet engine under conditions comparable to those encountered in existing jet engines.

According to the invention, the bay 12 is essentially formed by two separate parts, constituted by a rear structural element 28 and by a front structural element 30.

More specifically, the rear structural element 28 forms a rearwardly tapered box and its rear edge defines the trailing edge 32 of the bay. This rear structural element 28 is entirely located to the rear of the arms 24 and extends over a length less than half the total length of the bay 12, in the air flow direction. The rear structural element 28 receives in its front part the not shown thrust reverser of the jet engine. It generally also incorporates two cowls articulated to the pylon 14, so as to give access to the core engine 16 during maintenance operations. The rear structural element 28 is fixed to the pylon 14 and/or to the fan case 40.

According to the invention, the front structural element 30 of the bay 12 integrates an air intake box 34, which forms the front end of the bay, as well as an external shell 36, which extends rearwardly, without any discontinuity, the external surface of the air intake box 34. The sum length of the air intake box 34 and the external shell 36 is at least equal to half the total length of the bay 12 in the air flow direction, i.e. parallel to the longitudinal axis 20. Consequently, the front structural element 30 has a continuous, external surface extending over at least 50% of the geometrical chord of the bay, as from the trailing edge 36. The absence of any surface discontinuity and the adoption of an optimized aerodynamic shape consequently makes it possible to ensure a laminar air flow around the bay 12.

In practice, the front structural element 30 is formed by two parts connected to one another by dismantlable fixing means. These two parts are constituted by a front lip 38 and by a main structure 39 (FIG. 1).

The front lip 38 solely forms the front end of the air intake box 34, which defines the leading edge 26. It is a wearing metal part, which the abrasion and erosion risks require that it be of a dismantlable nature.

The main structure 39 of the front structural element 30 is made in one piece and includes most of the air intake box 34, as well as the external shell 36. This main structure can be made from metal, of composite material or a combination of these two technologies. At least part of its walls conventionally undergo an acoustic treatment. The external shell 36 can in particular be made from sandwich-type, composite material, in order to give a good rigidity.

As is more particularly illustrated by FIG. 1, the front structural element 30 has, at least in its rear part constituted by the external shell 36, a protuberance 42 surrounding, without discontinuity, whilst shrouding it, the front part of the pylon 14. This feature makes it possible to optimize the aerodynamic shape over the entire front half of the bay, including in the attachment area of the jet engine to the pylon 14.

According to the invention, the front structural element 30 is connected to the fan case 40, in such a way that the aerodynamic shape of the external surface of said element is effectively maintained when the aircraft is flying, whilst allowing access to the annular zone 43 defined between the fan case 40 and the external shell 36.

Figure 3:
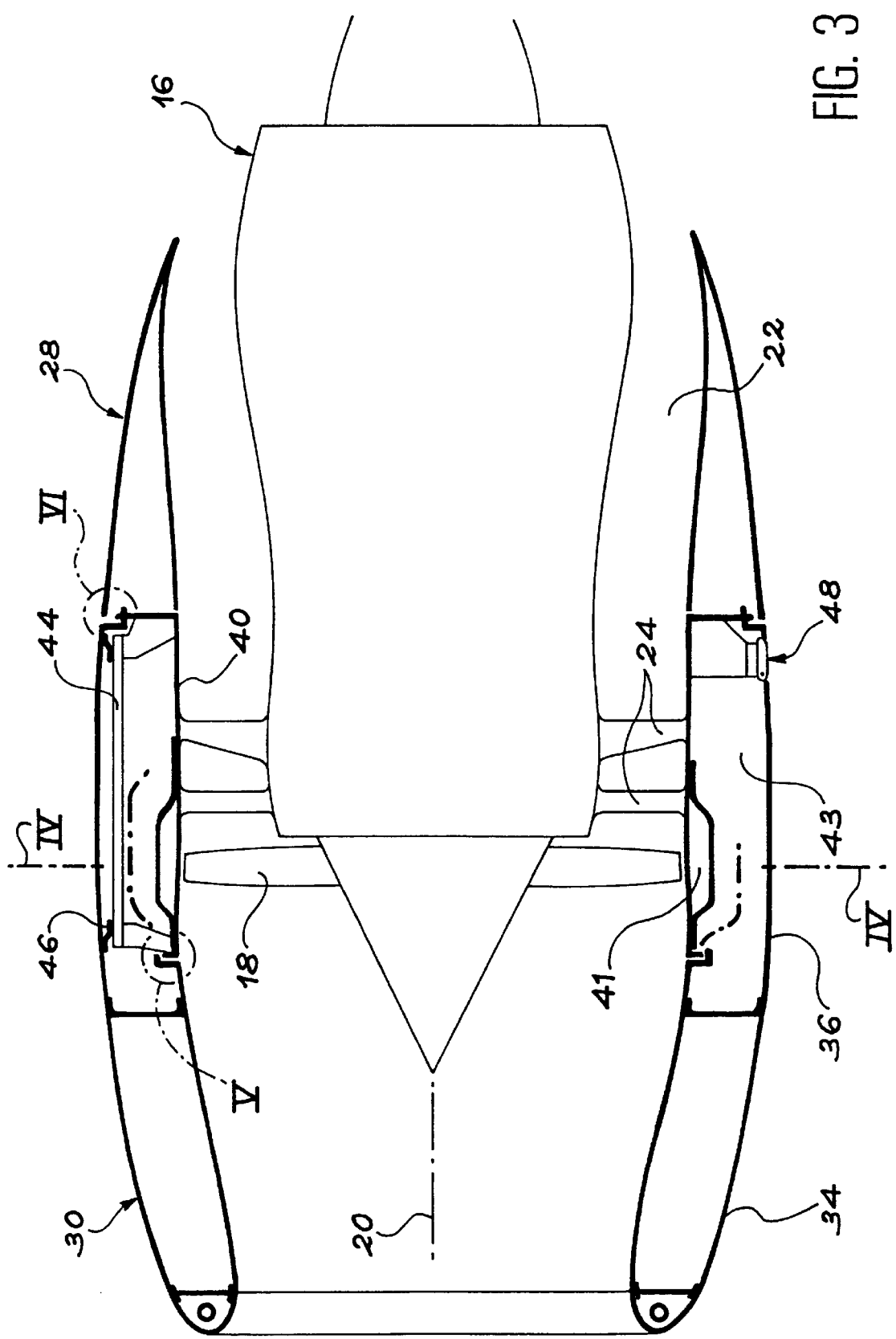
FIG. 3 A longitudinal sectional view comparable to FIG. 2, illustrating in the upper part the maintenance and guidance means ensuring the sliding of the front structural element of the bay and, in the lower part, the latches normally locking it in the flight position.
Figure 4:
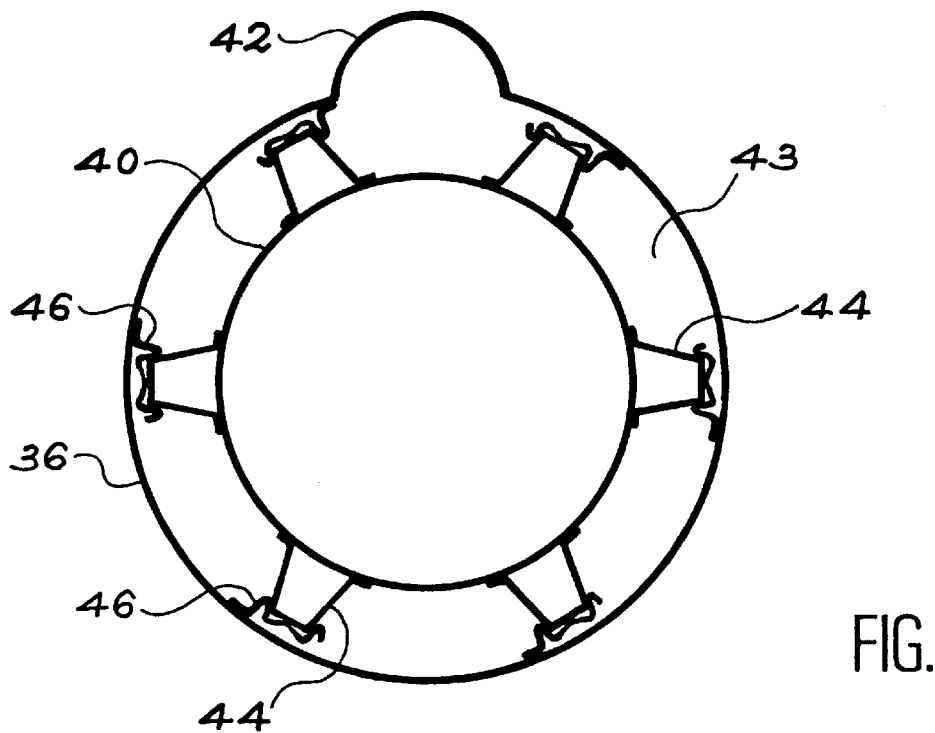
FIG. 4 A section along line IV—IV of FIG. 3.

As is more particularly illustrated by FIG. 4 and the top part of FIG. 3, the front structural element 30 is fitted to the fan case 40 by maintenance and guidance means constituted by slides 44 in the preferred embodiment described. More specifically, the fan case 40 carries on its outer surface a certain number of slides 44 (six in FIG. 4), which extend over most of its length, parallel to the longitudinal axis 20. These slides 44 are regularly distributed over the entire circumference of the fan case 40, so as to ensure an effective maintenance of the external shell 36 when the aircraft is flying.

In particular, two of the slides 44 are placed in the upper part of the bay, so as to reloop the forces. In the embodiment shown, which corresponds to an isostatic installation, all the slides 44 are supported by the fan case 40.

As a variant, the two sides installed in the upper part of the bay can be fixed to the pylon 14. Part of the forces is then directly transmitted to the pylon, which leads to a hyperstatic fitting of the bay 12.

Each of the slides 44 cooperates with a rail 46 installed within the external shell 36, so as to ensure a limited sliding to the front of the front structural element 30, parallel to the longitudinal axis 20 of the bay. This sliding enables the front structural element 30 to move between a rear, flight position, illustrated in mixed line form in FIG. 2 and in continuous line form in FIG. 3, and a front, maintenance position, illustrated in continuous line form in FIGS. 1 and 2. The cooperation between the slides 44 and the rails 46 is such that a rotation of the front structural element 30 about a fan case 40 is not possible.

As is illustrated by FIGS. 3 and 4, the slides 44 are made in such a way that they are spaced from the fan case 40 by a distance exceeding a maximum possible deformation of the latter (illustrated in mixed line form in FIG. 3) liable to be produced by a breaking of the blade of fan 18. More specifically, the fan case 40 has, around the fan 18, a reinforced part 41 known as a shield, whose maximum deformation in the case of a blade fracture has virtually no consequence on the slides 44, because the latter are at a sufficient distance from the case 40.

In order to ensure the locking of the front structural element 30 in its rear flight position, locking means are provided between the front structural element 30 and the rear structural element 28 of the bay. As illustrated at the bottom of FIG. 3, said locking means are constituted by a certain number of latches 48, regular distributed over the entire circumference about the longitudinal axis 20. For example, five or six latches can be provided between the two elements constituting the bay. The latches 48 are oriented parallel to the longitudinal axis 20, so as to ensure an optimum force transmission between the two elements.

In the preferred embodiment, diagrammatically illustrated in FIG. 3, the latches 48 are interposed between the rear end of the front structural element 30 (i.e. the external shell 36) and the front end of the rear structural element 28 (i.e. the front frame of the thrust reverser, whose architecture remains unchanged compared with existing jet engines).

In order not to produce parasitic deformations of the front structural element 30 and in particular its external shell 36, no link is provided between the element 30 and the pylon 14.

Figure 5:
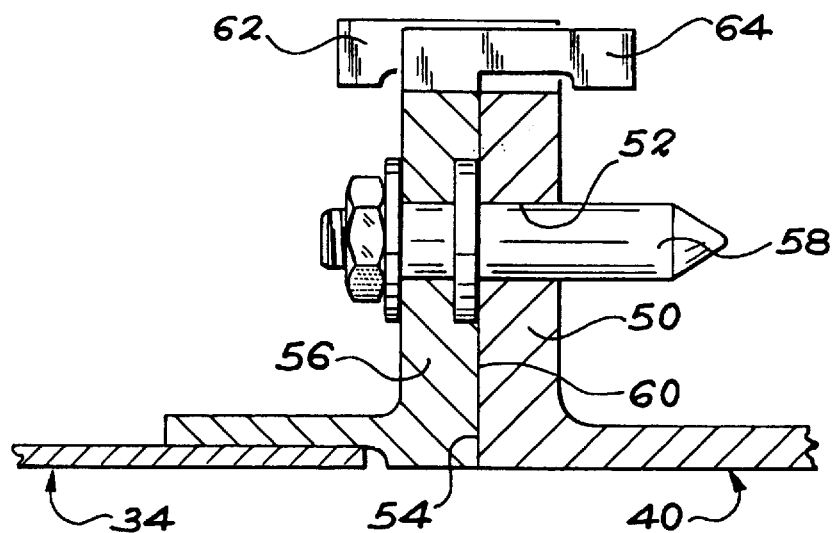
FIG. 5 A larger scale sectional view of zone V in FIG. 3.
Figure 6:
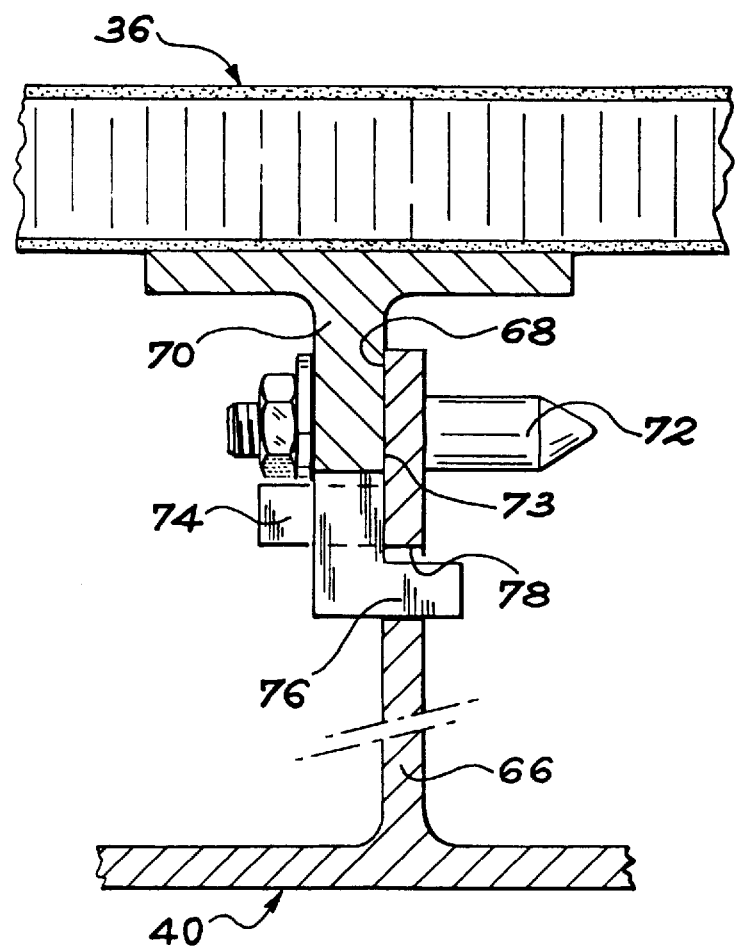
FIG. 6 A larger scale sectional view of zone VI in FIG. 3.

In order to ensure the transmission of axial forces, despite the absence of a link between the front structural element 30 and the pylon 14, said front structural element cooperates directly with the fan case 40, to the front and rear thereof, by means of two connecting structures, which will now successively be described relative to FIGS. 5 and 6.

FIG. 5 illustrates the connecting structure by which the front structural element 30 cooperates with the front end of the fan case 40. The fan case 40 is provided at its front end with an external flange 50, provided over its entire periphery with holes 52. The front face of the flange 50 defines a bearing surface 54, oriented radially with respect to the longitudinal axis 20.

An external flange 56 is connected to the front end of the inner wall of the air intake box 34. This flange 56 is traversed by holes, in which are fixed shear pins 58, which are oriented to the rear, parallel to the longitudinal axis 20. More specifically, the number and arrangement of the shear pins 58 is such that one of said pins is normally received, with virtually no clearance, in each of the holes 52 of the flange 50 when the front structural element 30 occupies its rear, flight position. The front face of the flange 56 forms a front abutment surface 60, which then bears against the bearing surface 54 of the flange 50.

The end of the flange 50 carries forwardly oriented tongues 62, so as to face the outer, peripheral edge of the flange 56, when the front structural element 30 is in the rear, flight position. In the same way, the end of the flange 56 carries rearwardly oriented tongues 64, so as to face the peripheral edge of the flange 50. This arrangement, in which clearances are provided between the tongues 62, 64 and the flanges 56, 50, makes it possible to replace the shear pins 58 if the latter fracture.

FIG. 6 shows a connecting structure comparable to that described relative to FIG. 5 and which is located between the front structural element 30 and the rear end of the fan case 40. The fan case 40 carries, in the vicinity of its rear end, an external flange 66 traversed by not shown holes over its entire circumference. The front face of the flange 66 forms a bearing surface 68.

An internal flange 70 is located in the external shell 36, in the vicinity of its rear end. This flange 70 carries rearwardly oriented shear pins 72, parallel to the longitudinal axis 20, so as to normally penetrate with virtually no clearance the holes formed in the flange 66, in the rear, flight position of the front structural element 30. The rear face of the flange 70 forms a rear abutment surface 73, which then bears against the bearing surface 68.

Arms 74 project forwards from the flange 66, beyond the inner, peripheral edge of the flange 70. In the same way, arms 76 project rearwards from the peripheral edge of the flange 70, through notches 78 formed for this purpose in the flange 66. This arrangement, where there is a radial clearance between the arms 74, 76 and the flanges 70, 66, makes it possible to replace the shear pins 72 if the latter fracture.

FIG. 4 shows the case where the guidance means interposed between the front structural element 30 and the fan case 40 are constituted by slides 44 regularly distributed over the entire jet engine circumference. This arrangement assumes that the accessory box normally installed in the bay 12 is rearwardly displaced with respect to the slides and is e.g. installed in the rear structural element 28. During maintenance, the forwards displacement of the front structural element 30 along the slides 44 can be limited to a maximum value of approximately 500 mm. Thus, such a displacement is adequate for freeing the interfaces of the pylon 14, as well as electrical units installed in the annular space 43.

The accessory box, which contains equipments such as a direct current generator, hydraulic pumps, etc., requires numerous maintenance actions. When this box is installed in the annular space 43 formed between the external shell 36 and the fan case 40, the maximum forward sliding of the front structural element 30 must be greater, e.g. approximately 800 mm.

Figure 7:
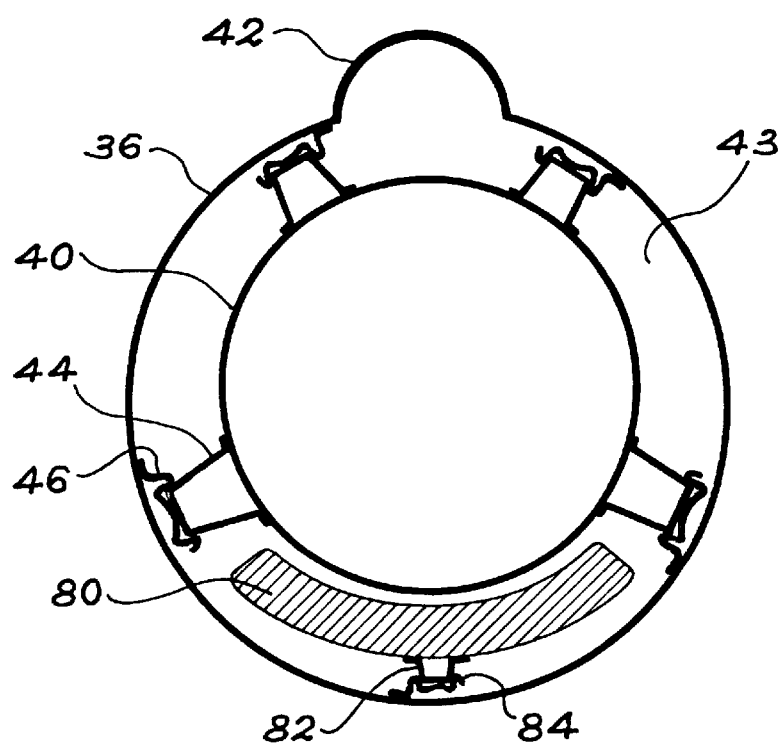
FIG. 7 A section comparable to FIG. 4 illustrating a variant of the invention.

FIG. 7 illustrates the case where the accessory box 80 is installed in the annular space 43 formed between the external shell 36 and the fan case 40. In this case, certain of the slides 44 to the right of the box 40 are eliminated and replaced by one or more skids 82 connected to the box. These skids contribute, like the slides 44, to maintaining the rigidity of the front structural element 30. Each of the skids 82 cooperates with a rail 84 comparable to the rails 46.

The sliding character of the front structural element 30 makes it necessary to use special arrangements with respect to the lines routed in said element.

Thus, and as shown in the upper part of FIG. 8, the front lip 38 of the air intake box 34 is generally provided with deicing means, which are supplied with hot air by one or more rigid lines. To permit the sliding of the front structural element 30, each of these lines has a front section 86, installed in the front structural element 30, and a fixed, rear section 88, carried by the fan case 40. These two line sections 86, 88 are aligned parallel to the jet engine longitudinal axis 20, so as to normally bear by their ends, when the front structural element is in the rear, flight position. The thermal expansion of the two line sections 86, 88 makes it possible to ensure, at the junction between said two sections, a pressure compatible with a minimum leakage level. A stiffening element 90, incorporated into the section 86, prevents excessive stresses being applied to the line in the case of a high expansion level.

As illustrated in the lower part of FIG. 8, fluid discharge lines, such as the deicing discharge line 92, can be installed in the front structural element 30. These lines then issue onto the outer surface of the bay, by an orifice 94 provided in the rear structural element 28, but without interfering with said element during the sliding of the front structural element. Thus, the fluids are evacuated into the non-laminar, rear part of the outer surface of the bay.

Lines comparable to line 92 can be used, particularly for draining the accessory box 80.

The bay 12 can also be equipped with flexible lines such as line 96 in FIG. 8, whereof one end is connected to a pressure or temperature sensor or probe 97 installed on the front structural element 30. The opposite end of the flexible line 96 is then coiled in a receptacle 98 carried by the fan case 40 or by the rear structural element 28. Tension means 99 associated with said receptacle 98 maintain the line wound therein.

It should be noted that the displacements of the front structural element 30 between its flight position and its maintenance position can be implemented manually or by means of an ancillary system actuator installed in the bay.

As has already been stated, the jet engine thrust reverser is located in the rear structural element 28, immediately to the rear of the external shell 36. When the thrust reverser is a door-type reverser, said doors can optionally slightly cover the rear end of the external shell 36 in the flight position. This feature then makes it possible to improve the structural behaviour of the shell 36, particularly in the case of a fracture of the blade of fan 18.

It should finally be noted that the original architecture of the bay according to the invention makes it possible to use most of the known procedures for transferring forces to the pylon.

What is claimed is:

1. Jet engine bay carried by a suspension pylon and comprising:
   a rear structural element,
   a front structural element, integrating an air intake box and an external shell extending rearwards and without any discontinuity, an external surface of the air intake box, so that the front structural element has a continuous, external surface extending over at least 50% of the geometrical chord of the bay,
   maintenance and guidance means, interposed between the front structural element and a jet engine fan case, so as to allow a limited sliding forwards of the front structural element parallel to a longitudinal axis of the bay and
   locking means normally opposing said sliding, and wherein said front structural element comprises a protuberance surround, without discontinuity, and shrouding a front part of said suspension pylon.

2. Bay according to claim 1, wherein the front structural element has a main structure, in one piece, and an interchangeable, front lip, installed on the front end of the main structure using dismantlable fixing means.

3. Bay according to claim 1, wherein the locking means comprise latches oriented substantially parallel to said longitudinal axis and interposed between a rear end of the front structural element and a front end of the rear structural element.

4. Bay according to claim 1, wherein the front structural element has a rear abutment surface, normally bearing against a bearing surface formed on the fan case.

5. Bay according to claim 4, wherein shear pins project rearwards along the longitudinal axis of the bay, from said abutment surface, in order to penetrate without clearance in holes formed in the bearing surfaces or vice versa.

6. Bay according to claim 1, wherein the guidance means comprise slides carried by the fan case on which can slide the front structural element, said slides being spaced from the fan case by a distance exceeding the maximum deformation of the latter liable to be caused by a blade fracture.

7. Bay according to claim 1, wherein at least one rigid line, housed in the bay, has a front section installed in the front structural element and a fixed, rear section, said two sections being aligned parallel to the longitudinal axis of the bay in communication with one another.

8. Bay according to claim 1, wherein a flexible line has a first end connected to the front structural element and a second end coiled in a fixed receptacle, under the action of tension means.

9. Bay according to claim 1, wherein at least one fluid discharge line, housed in the front structural element, issues to the outside into the rear structural element.

10. Bay according to claim 1, wherein an accessory box is housed in the rear structural element.

11. Bay according to claim 1, wherein an accessory box is housed between the fan case and the front structural element.

12. A jet engine bay having a longitudinal axis and comprising:

a rear structural element;

a front structural element having a continuous external surface;

maintenance and guidance means for said front structural element, allowing a limited sliding forward movement of said front structural element parallel to said longitudinal axis; and locking means normally opposing said sliding forward movement, wherein said front structural element includes an air intake box and an external shell which extends an external surface of said air intake box rearwards, without any discontinuity, whereby a continuous external surface of the front structural element extends over at least 50% of the geometrical chord of the bay, and wherein all the maintenance and guidance means are carried by an engine fan case and regularly distributed over a circumference of said fan case.

13. A jet engine bay carried by a suspension pylon and having a longitudinal axis and comprising:

a fan case;

a fixed rear structural element;

a movable front structural element having a continuous external surface;

maintenance and guidance means for said front structural element allowing a limited sliding forward movement of said front structural element parallel to said longitudinal axis; and locking means normally opposing said sliding forward movement, wherein said front structural element includes an air intake box and an external shell extending an external surface of said air intake box rearwards, without any discontinuity, whereby a continuous external surface of the front structural element extends over at least 50% of the geometrical chord of the bay, and wherein all the maintenance and guidance means are carried by said fan case and regularly distributed over a circumference of said fan case.

14. A jet engine bay carried by a suspension pylon and having a longitudinal axis and comprising:

a rear structural element;

a front structural element having a continuous external surface;

maintenance and guidance means for said front structural element parallel to said longitudinal axis; and locking means normally opposing said sliding forward movement, wherein said front structural element includes an air intake box and an external shell extending an external surface of said air intake box rearwards, without any discontinuity, whereby a continuous external surface of the front structural element extends over at least 50% of the geometrical chord of the bay, and wherein all the maintenance and guidance means are constituted by slides, regularly distributed over the entire circumference of an engine fan case and extending over most of the length of said fan case.

15. A bay for a jet engine carried by a suspension pylon and having a longitudinal axis, said bay comprising:

a rear structural element, a front structural element having a continuous external surface;

maintenance and guidance means for said front structural element parallel to said longitudinal axis; and locking means normally opposing said sliding forward movement, wherein said front structural element includes an air intake box and an external shell extending an external surface of said air intake box rearwards, without any discontinuity, whereby a continuous external surface of the front structural element extends over at least 50% of the geometrical chord of the bay, wherein all the maintenance and guidance means are carried by an engine fan case and regularly distributed over a circumference of said fan case, and wherein said front structural element comprises a protuberance surrounding, without discontinuity, and shrouding a front part of said suspension pylon.

* * * * *